April 29, 1969 R. W. SARGENT 3,440,878
FLUID QUANTITY SENSOR
Filed April 14, 1966

United States Patent Office 3,440,878
Patented Apr. 29, 1969

3,440,878
FLUID QUANTITY SENSOR
Raymond W. Sargent, Burlington, Vt., assignor to Simmonds Precision Products, Inc., Tarrytown, N.Y., a corporation of New York
Filed Apr. 14, 1966, Ser. No. 542,604
Int. Cl. G01f 3/14
U.S. Cl. 73—239         3 Claims

ABSTRACT OF THE DISCLOSURE

A fluid quantity sensor having a hollow cylinder with a piston mounted for reciprocal movement therein and a slide valve coaxial with the cylinder for controlling liquid inlet and liquid outlet passages and a signal producing means operative when the piston has moved to a predetermined position.

---

Figure 1:
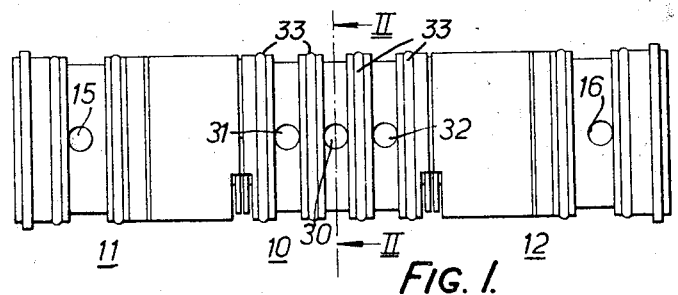

The invention relates to an instrument responsive to a predetermined quantity of liquid.

It is an object of the invention to provide an improved instrument responsive to a predetermined quantity of liquid.

It is another object of the invention to provide an instrument which produces an electrical signal in response to the sensing of a predetermined quantity of liquid.

It is a further object of the invention to provide an improved instrument arranged for connection in series with a circuit in which liquid is flowing, the instrument producing an electrical indication each time a predetermined quantity of the liquid has passed through the instrument. Such an instrument may readily be coupled with a counter for counting the number of electrical indications in a given time period so as to indicate the rate of flow of the liquid in the said circuit.

According to one aspect of the invention, there is provided a liquid volume responsive instrument comprising a body portion, having liquid inlet and liquid outlet passages, a hollow cylinder mounted on the body portion having a closed end and a liquid inlet and outlet port, a piston reciprocable in the cylinder, a slide valve reciprocable on the body portion along an axis co-axial with the said cylinder for controlling the interconnection of the said liquid inlet and liquid outlet passages with the said liquid inlet and liquid outlet port, means mounted between the piston and the slide valve for moving the slide valve in dependence upon the movement of the piston to so interconnect the liquid inlet and liquid outlet passages with the liquid inlet and liquid outlet port as to cause the piston to reciprocate in response to liquid flow into the liquid inlet passage, and signal-producing output means mounted on the body portion and operative only when the piston has moved to a predetermined position remote from said closed end of the said cylinder.

According to another aspect of the invention, there is provided a liquid volume responsive instrument for measuring liquid flow, comprising a body portion having a liquid inlet passage and a liquid outlet passage for connection in series with said liquid flow, a first and a second co-axial and axially spaced hollow cylinders mounted on the body portion, each cylinder having a closed end and a communicating liquid inlet and liquid outlet port, a first piston reciprocable in the first cylinder, a second piston reciprocable in the second cylinder, a slide valve reciprocably mounted in the body portion for selectively connecting the said liquid inlet and liquid outlet passages to the liquid inlet and liquid outlet ports of the first and second cylinders, a common piston rod rigidly interconnecting the first and second pistons and passing freely through and co-axial with the slide valve, first resilient means mounted on the piston rod between the first piston and the slide valve, second resilient means mounted on the piston rod between the second piston and the slide valve, locking means for locking the slide valve in a first position in which the liquid flow forces the pistons in a first sliding direction to store energy in the first said resilient means and for locking the slide valve in a second position in which the liquid flow forces the pistons in the opposite sliding direction to store energy in the second said resilient means, releasing means mounted on the body portion and actuated by each said piston, when the said piston has moved to a predetermined position remote from the closed end of its cylinder, for releasing the locking means to permit the slide valve to move from one said locking position to the other said locking position under the influence of the stored energy released from the respective resilient means, and signal-producing output means mounted on the body portion and operative only when a said piston has moved to a said predetermined position for producing an output signal indicative of flow of a predetermined quantity of said liquid through said instrument.

The invention provides an instrument which is an improvement over that described in my co-pending patent application, Ser. No. 485,372, now Patent No. 3,334,203.

Figure 2:
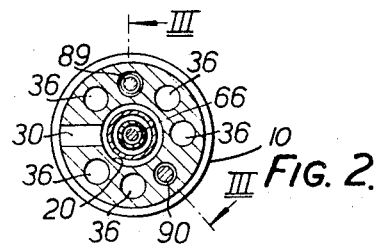
Figure 4:
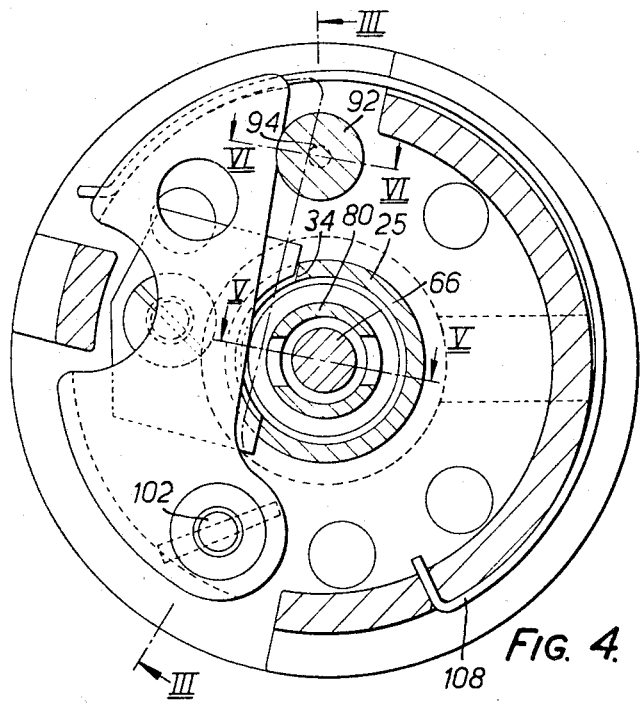
Figure 3A:
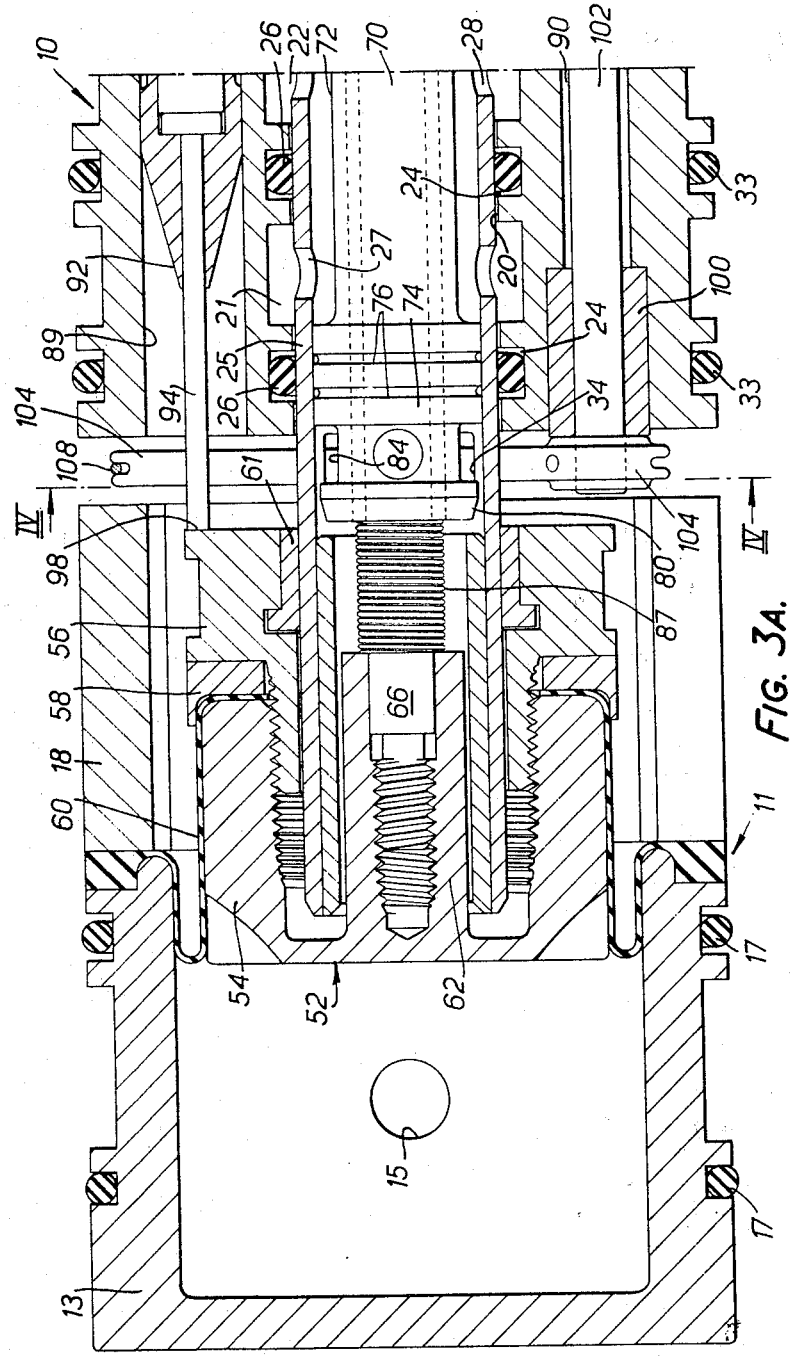
Figure 3B:
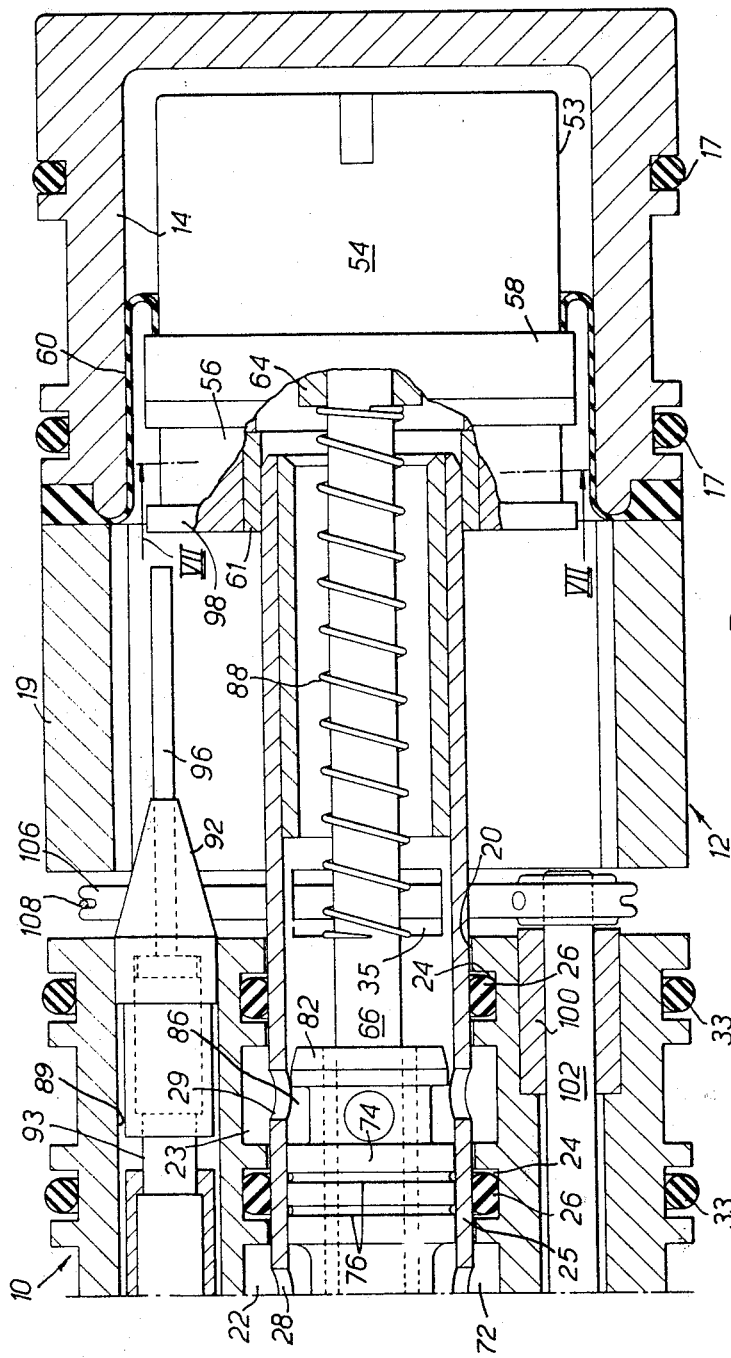
Figure 5:
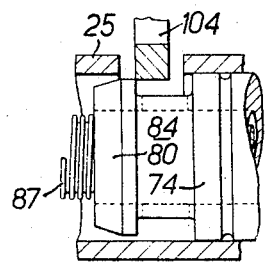
Figure 6:
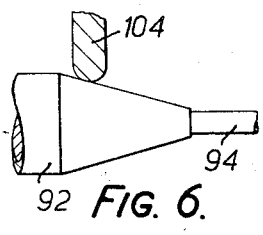
Figure 7:
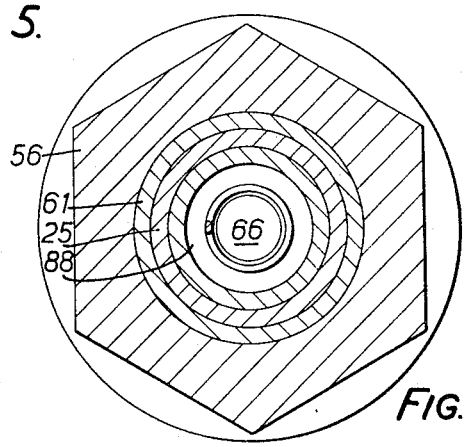
Figure 8:
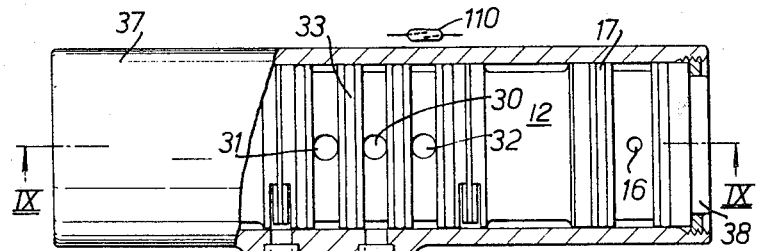
Figure 9:
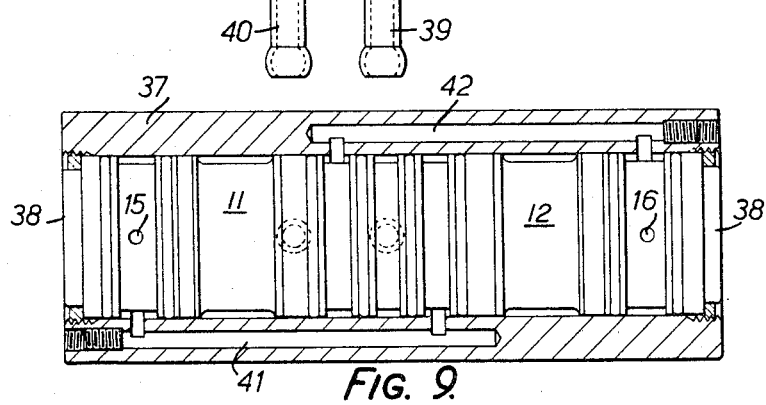

A liquid volume responsive instrument embodying the invention will now be described by way of example and with reference to the accompanying drawings in which:

FIGURE 1 is a side elevation of the instrument;
FIGURE 2 is a section through the instrument on the line II—II of FIGURE 1;
FIGURE 3a is a section on the line III—III of FIGURE 2;
FIGURE 3b is a section on the line III—III of FIG. 4;
FIGURE 4 is a section on the line IV—IV of FIGURE 3a;
FIGURE 5 is a section on the line V—V of FIGURE 4;
FIGURE 6 is a section on the line VI—VI of FIGURE 4;
FIGURE 7 is a section on the line VII—VII of FIGURE 3b;
FIGURE 8 is a partially sectioned elevation of a housing showing the instrument mounted therein; and
FIGURE 9 is a sectioned side elevation on the line IX—IX of FIGURE 8.

The instrument comprises a body assembly built up from a central portion 10 and two hollow cylinder assemblies 11 and 12. Each cylinder assembly 11, 12 comprises a cylinder head 13, 14 having an inlet port 15, 16 (FIGURES 1 and 3a and 3b) and two extended O-rings 17, and a tail portion 18, 19.

The central portion 10 has a central through-bore 20, having annular recesses providing valve ports 21, 22 and 23, and further annular recesses 24, as shown in FIGS. 3a and 3b. A hollow valve sleeve 25 is mounted in the bore 20 and is surrounded by O-rings 26 located in the recesses 24 so as to isolate the valve ports 21, 22, 23 from each other. The valve sleeve 25 is provided with ports 27, 28 and 29 which are respectively aligned with the valve ports 21, 22 and 23. A liquid outlet passage 30 (FIGURES 1 and 2) communicates with the valve port 22 and further passages 31 and 32 communicate with the valve ports 21 and 23. As shown in FIGURES 1 and 3a and 3b, further external O-rings 33 are provided on the central portion 10, these O-rings being positioned alongside the ports 30, 31 and 32.

The valve sleeve 25 is of such length as to extend into the tail portions 18, 19 of the cylinder assemblies 11 and 12, shown in FIGS. 3a and 3b, respectively, and contains two slots 34 (FIG. 3a) and 35 (FIG. 3b) each of which is positioned in the gap between the central portion 10 and a respective one of the cylinder assemblies 11 and 12. The central portion 10 is provided with through bores 36 (FIGURE 2) which interconnect the gaps between the central portion 10 and the cylinder assemblies 11 and 12.

In use, the instrument is mounted in a housing 37 (FIGURES 8 and 9) having a through bore against the surface of which the O-rings 17 and 33 press in sealing engagement. The housing 37 has open ends which are internally threaded to receive end rings 38 which hold the instrument in place and secure the central portion 10 and the two cylinder assemblies 11 and 12 together.

The housing 37 has an outlet connection 39 communicating with the inside of the housing and so positioned as to be aligned with the liquid outlet passage 30 when the instrument is in place in the housing. The O-rings 33 on each side of the outlet passage 30 provides a liquid-tight seal between the outlet connection 39 and the outlet passage 30.

The housing also has an inlet connection 40 communicating with the inside of the housing and so positioned as to be aligned with the gap between the central portion 10 and the cylinder assembly 11. In operation, as will be explained, liquid flowing into the instrument flows through this gap. A liquid-tight seal between this gap and the inlet connection 40 is provided by the appropriate one of the O-rings 33 and the appropriate one of the O-rings 17 on the cylinder assembly 11.

The housing 37 also contains two bores 41 and 42 (FIGURE 9) in its wall which are respectively positioned so as to connect the port 15 to the passage 32 (FIGURES 1 and 8), and the port 16 to the passage 31 (FIGURES 1 and 8), when the instrument is in place in the housing. Liquid-tight seals are provided by appropriate ones of the O-rings 17 and 33.

Each cylinder head 13, 14, contains a slidable piston assembly 52, 53. As shown in FIGURES 3a, 3b and 7, each piston assembly comprises a piston head 54 and a hexagonally shaped tail 56 which are screwed together with a washer 58 between them. The inner periphery of a rolling synthetic rubber diaphragm 60 is also clamped between the head and tail of each piston assembly, the outer periphery of the diaphragm being clamped between the head and the tail portion of the respective cylinder assembly. The diaphragms provide a liquid-tight seal between the inner wall of the cylinder head and the piston head. The portion 56 of each piston assembly 52, 53 is recessed to receive and locate a bushing 61 which provides a bearing surface between the piston assembly and the external surface of the valve sleeve 25 on which, therefore, the piston assemblies are freely slidable. Each piston assembly 52, 53 has a re-entrant portion 62 (FIG. 3a), 64 (FIG. 3b) which is internally bored and threaded to receive a respective threaded end of a common piston rod 66 which extends through the valve sleeve 25, thus rigidly interconnecting the two piston assemblies 52, 53, which move as one unit.

The valve sleeve 25 is arranged to receive a shuttle valve 70, as shown in FIG. 3a. The shuttle valve 70 comprises a narrowed central portion 72, and two larger-diameter portions 74 provided with sealing rings 76 which bear against the internal surface of the valve sleeve 25 to provide a liquid-tight seal, as shown in FIGS. 3a and 3b. The valve 70 also has end extensions 80 (FIG. 3a) and 82 (FIG. 3b) which define annular recesses 84 and 86. The valve 70 has a through-bore of substantially larger diameter than the piston rod 66 so that the valve and the piston rod can move independently of each other. A compression spring 8 (FIG. 3a) is mounted on the piston rod 66 between the re-entrant portion 62 of the piston assembly 52 and one end of the shuttle valve 70, and a further compression spring 88 (FIG. 3b) is mounted on the piston rod 66 between the re-entrant portion 64 of the piston assembly 53 and the other end of the shuttle valve 70.

The central portion 10 of the body defines two further through-bores 89 and 90 (see FIGURES 2 and 3a) which are spaced radially with respect to the valve sleeve 25. The bore 89 receives a slidable double-ended cone-shaped cam 92. Two push rods 94 (FIG. 3a) and 96 (FIG. 3b) respectively protrude from opposite ends of the cam and are arranged to be engaged by surfaces 98 on the tail portions 56 of the piston assemblies 52 and 53 respectively. Therefore, the cam 92 is pushed to and fro along the bore 89 as the two interconnected piston assemblies 52 and 53 move in their respective cylinder heads. The cam 92 carries a permanent magnet 93, as shown in FIG. 3b. The bore 90 in the central portion 10 contains two bushings 100 which rotatably support a rod 102 which is rigidly connected at its two ends to two locking plates 104 and 106 respectively (see FIGS. 3a, 3b and 4). As shown, the two locking plates 104 and 106 are alined with the openings 34 and 35 in the valve sleeve 25, and, as shown in FIGURE 4, are biased towards these openings by springs 108.

The operation of the instrument will now be described. It will be assumed initially that the shuttle valve 70 is in the position illustrated in FIG. 3a so that the annular recess 84 is alined with the slot 34 in the valve sleeve 25; therefore, the locking plate 104, which is biased into the slot 34 by the spring 108 (see FIGURE 4), enters the recess 84 (see FIGURE 5) and locks the shuttle valve 70 against longitudinal movement. In this position, the shuttle valve 70 is so positioned that the port 23 is connected, through the slot 35, the bores 36 and the slot 34, to the liquid inlet connection 40 (FIGURE 8). Liquid flowing into the inlet connection 40 therefore flows through the port 23 and the passages 32, along the passage 41 (FIGURE 9) in the housing 37 and into the cylinder head 13 through the port 15. The piston assemblies 52 and 53 are therefore forced to the right into the position illustrated in FIGS. 3a and 3b. As the shuttle valve 70 is locked against longitudinal movement, the piston assembly 52, as shown in FIG. 3a, in moving to the right, compresses the spring 87. In addition, the surface 98 on the tailportion 56 of the piston assembly 52 engages the push rod 94 and moves the cone-shaped cam 92 to the right along its bore 89.

When the piston assembly 52 has moved to the right for a predetermined distance (so that a predetermined quantity of liquid has entered the cylinder head 13), the cone-shaped cam 92 will have been moved sufficiently far to the right for one of its cone-shaped ends to engage the locking plate 106 (see FIG. 3b). The locking plate 106 will therefore be forced out of the slot 35 in the valve sleeve 25 and, because of its interconnection with locking plate 104 through the rod 102 (see FIG. 3a), the locking plate 104 will likewise be forced out of the opening 34 in the valve sleeve and out of engagement with the annular recess 84 in the shuttle valve 70 (see FIGURE 5). Hence the shuttle valve 70 is no longer locked against longitudinal movement and will be rapidly forced to the right by the energy stored in the compressed spring 87. The shuttle valve 70 will therefore assume the position in which its annular recess 86 is in alinement with the slot 35 in the valve sleeve 25; in this position, the annular space defined by the portion 72 of the shuttle valve and the inner surface of the valve sleeve 25 will interconnect the valve ports 22 and 23, thus connecting the liquid outlet connection 39 (FIGURE 8) to the port 15 in the cylinder head 13 through the passage 41 (FIGURE 9). The valve port 23 will no longer be connected to the liquid inlet connection 40; instead, the valve port 21 will be connected to the inlet connection 40 through the slot 34 in the valve sleeve 25. Therefore, liquid flowing into the instrument will now enter the cylinder 14, through the port 16, by means of the port 21 and the passage 42 (FIGURE 9).

In this new position of the shuttle valve 70, the liquid forces the piston assemblies 52 and 53 to the left, as viewed in FIGS. 3a and 3b. When the surface 98 on the base 56 of the piston assembly 53 (see FIG. 3b) engages the push rod 96, the cone-shaped cam 92 will begin to move to the left as viewed in FIGURE 3b, so as to move out of engagement with the locking plate 106. The two locking plates 104 and 106 therefore re-assume their original positions, under the action of the springs 108, so that the locking plate 106 enters the opening 35 in the valve sleeve 25 and engages the recess 86 thus locking the shuttle valve 70 in its extreme right hand position. As the piston assembly 53 continues to move to the left under the influence of the incoming liquid, the spring 88 is therefore compressed. Movement of the piston assembly 52 to the left forces the liquid in the cylinder 13 to exhaust through the passage 41, the ports 23 and 22 and the outlet connection 39 (see FIGURE 8).

When the piston assembly 53 has moved a predetermined distance to the left, so that the predetermined quantity of liquid has entered the cylinder head 14, the cone-shaped cam 92 will engage the plate 104 (see FIGURES 4 and 6) and will force both locking plates 104 and 106 away from the openings 34 and 35 in the valve sleeve 25, thus releasing the shuttle valve 70. The shuttle valve will therefore move rapidly to the left (that is, into the position illustrated in FIGURE 2) under the influence of the energy stored in the compressed spring 88, thus reconnecting the port 15 in the cylinder head 13 to the liquid inlet connection 40 through the passage 41 (FIGURE 9), the port 23, the slot 35, the bores 36 (FIGURE 2) and the slot 34; at the same time, the port 16 in the cylinder head 14 is connected to the liquid outlet connection 39 (FIGURE 8) through the passage 42 (FIGURE 9) and the ports 21 and 22, these ports being interconnected by the space defined by the narrowed portion 72 of the shuttle valve 70. The piston assemblies 52 and 53 therefore move to the right once more, the liquid in the cylinder head 14 being expelled through the outlet connection 39.

The cycle described is repeated for so long as the instrument is connected to the liquid supply. Each time a predetermined quantity of the liquid flows through the instrument, the cam 92 will slide from one extreme position in its bore 89 to the other extreme position, carrying the permanent magnet 93 with it. A reed switch 110 (FIG. 8) is mounted near the central position 10 of the instrument body in close proximity to the path of the magnet 93, and contains contacts which are operated each time the cam 92 moves from one of its extreme positions to the other. As explained, such movement of the cam only takes place in response to a predetermined quantity of liquid passing through the instrument. The contacts can therefore be connected in an electrical circuit to produce an electrical pulse in response to the passage of the predetermined quantity of liquid through the instrument. A count of the number of such pulses gives the total quantity of the liquid which has passed through the instrument and a count of the number of such pulses per unit time represents the rate of flow of the liquid.

In one embodiment of the invention, the instrument has a diameter of 1.187 inches and is 4.82 inches long. It weighs less than 0.5 lb. and is capable of measuring flow rates from 2.5 ml./minute to 700 ml./minute.:

Although there has been shown what is considered to be a preferred embodiment of the invention, it will be evident to a person skilled in the art that many changes and modifications may be made without departing from the essential spirit of the invention. It is intended, therefore, in the annexed claims, to cover all such changes and modifications as fall within the scope of the invention.

What is claimed is:

1. A liquid volume responsive instrument for measuring liquid flow, comprising a body portion having a liquid inlet passage and a liquid outlet passage for connection in series with said liquid flow, first and second co-axial and axially spaced hollow cylinders mounted on the body portion, each cylinder having a closed end and a communicating liquid inlet and liquid outlet port, a first piston reciprocable in the first cylinder, a second piston reciprocable in the second cylinder, a slide valve reciprocably mounted in the body portion for selectively connecting the said liquid inlet and liquid outlet passages to the liquid inlet and liquid outlet ports of the first and second cylinders, a common piston rod rigidly interconnecting the first and second pistons and passing freely through and co-axial with the slide valve, first resilient means mounted on the piston rod between the first piston and the slide valve, second resilient means mounted on the piston rod between the second piston and the slide valve, locking means for locking the slide valve in a first position in which the liquid flow forces the pistons in a first sliding direction to store energy in the first said resilient means and for locking the slide valve in a second position in which the liquid flow forces the pistons in the opposite sliding direction to store energy in the second said resilient means, releasing means mounted on the body portion and actuated by each said piston, when the said piston has moved to a predetermined position remote from the closed end of its cylinder, for releasing the locking means to permit the slide valve to move from one said locking position to the other said locking position under the influence of the stored energy released from the respective resilient means, and signal-producing output means mounted on the body portion and operative only when a said piston has moved to a said predetermined position for producing an output signal indicative of flow of a predetermined quantity of said liquid through said instrument.

2. A liquid volume responsive instrument comprising a body portion having liquid inlet and liquid outlet passages, hollow cylinder means mounted on the body portion having closed ends and a liquid inlet and outlet port means, piston means mounted for reciprocable movement in the cylinder means, a slide valve reciprocably mounted on the body portion along an axis co-axial with the said cylinder means for selectively interconnecting the said liquid inlet and liquid outlet passages with the said liquid inlet and liquid outlet port means, said slide valve being provided with a recess, spring means mounted between the piston means and the slide valve for moving the slide valve in dependence upon the movement of the piston means to interconnect the liquid inlet and liquid outlet passages with the liquid inlet and liquid outlet port means as to cause the piston means to reciprocate in response to liquid flow into the liquid inlet passage, releasable locking means mounted on the body portion for locking the slide valve against sliding motion until the piston means has reached a predetermined position whereby the spring means is compressed, said locking means comprising a locking member hingedly mounted on the said body portion and biasing means urging the locking member into engagement with the recess in the slide valve to prevent sliding motion thereof, releasing means mounted on the body portion for releasing the slide valve when the piston means has reached the said predetermined position, whereby the energy stored in the spring means is released to move the slide valve from its locked position, said releasing means comprising a cam member movable with the said piston for engaging the locking member when the piston means has moved to the said predetermined position to force the locking member out of engagement with the said recess in the slide valve against the action of the said biasing means, and a signal output means mounted on the body portion and operative to produce a pulse representative of the quantity of fluid flowing through said cylinder means only when the piston means has moved to a predetermined position remote from one of said closed ends of said cylinder means.

3. A liquid volume responsive instrument comprising a body portion having liquid inlet and liquid outlet passages, hollow cylinder means mounted on the body portion having closed ends and a liquid inlet and outlet port means, piston means mounted for reciprocable movement in the cylinder means, a slide valve reciprocably mounted on the body portion along an axis co-axial with the said cylinder means for selectively interconnecting the said liquid inlet and liquid outlet passages with the said liquid inlet and liquid outlet port means, said slide valve being provided with a recess, spring means mounted between the piston means and the slide valve for moving the slide valve in dependence upon the movement of the piston means to interconnect the liquid inlet and liquid outlet passages with the liquid inlet and liquid outlet port means as to cause the piston means to reciprocate in response to liquid flow into the liquid inlet passage, releasable locking means mounted on the body portion for locking the slide valve against sliding motion until the piston means has reached a predetermined position whereby the spring means is compressed, said locking means comprising a locking member hingedly mounted on the said body portion and biasing means urging tile locking member into engagement with the recess in the slide valve to prevent sliding motion thereof, releasing means mounted on the body portion for releasing the slide valve when the piston means has reached the said predetermined position, whereby the energy stored in the spring means is released to move the slide valve from its locked position, said releasing means comprising a cam member movable with the said piston means for engaging the locking member when the piston means has moved to the said predetermined position to force the locking member out of engagement with the said recess in the slide valve against the action of the said biasing means, a signal output means mounted on the body portion and operative to produce a pulse representative of the quantity of fluid flowing through said cylinder means only when the piston means has moved to a predetermined position remote from one of said closed ends of said cylinder means, and said signal-producing output means including a permanent magnet mounted on the said cam member for movement therewith, and electro-magnetic switch means fixedly mounted on said body portion so as to be in close proximity to, and to be influenced by, said permanent magnet when said piston means has moved to said predetermined position.

References Cited

UNITED STATES PATENTS

| | | | |
|---|---|---|---|
| 1,355,208 | 10/1920 | Bassler | 73—250 |
| 1,726,975 | 9/1929 | Bassler | 73—250 |
| 1,929,719 | 10/1933 | Werder | 73—251 |
| 3,101,616 | 8/1963 | Klein | 73—250 |
| 3,181,360 | 5/1965 | Hederhorst | 73—270 |

FOREIGN PATENTS 892,915   4/1962   Great Britain.

JAMES J. GILL, *Primary Examiner.*

ROBERT S. SALZMAN, *Assistant Examiner.*

U.S. Cl. X.R.

73—250